US006869981B2

(12) United States Patent
Fewkes et al.

(10) Patent No.: US 6,869,981 B2
(45) Date of Patent: Mar. 22, 2005

(54) OPTICAL FIBER COATINGS WITH PRESSURE SENSITIVE ADHESIVE CHARACTERISTICS

(75) Inventors: Edward J. Fewkes, Horseheads, NY (US); Gregory F. Jacobs, Elmira, NY (US); Inna I. Kouzmina, Corning, NY (US); Kevin R. McCarthy, Horseheads, NY (US); Huan-Hung Sheng, Charlotte, NC (US); Kristi L. Simonton, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 175 days.

(21) Appl. No.: 10/087,481

(22) Filed: Mar. 1, 2002

(65) Prior Publication Data

US 2003/0095770 A1 May 22, 2003

Related U.S. Application Data

(60) Provisional application No. 60/323,622, filed on Sep. 21, 2001.

(51) Int. Cl.[7] .................................................. C08F 2/46
(52) U.S. Cl. ............................. 522/33; 522/38; 522/64; 522/90; 522/96; 522/182; 522/113; 522/114; 522/119; 522/120; 522/121; 522/150; 522/157; 522/158; 522/159; 522/160; 522/109; 522/111; 428/378; 428/380; 428/383; 385/147
(58) Field of Search ............................... 522/109, 111, 522/90, 96, 182, 113, 114, 119, 120, 121, 150, 157, 158, 159, 160; 428/378, 380, 383; 385/147

(56) References Cited

U.S. PATENT DOCUMENTS

| | | | |
|---|---|---|---|
| 4,133,731 A | 1/1979 | Hansen et al. ......... 204/159.17 |
| 4,851,165 A | 7/1989 | Rennell, Jr. et al. ......... 264/1.5 |
| 5,179,171 A | 1/1993 | Minami et al. .............. 525/288 |
| 5,268,984 A | 12/1993 | Hosoya et al. ............... 385/128 |
| 5,286,682 A | 2/1994 | Jacobs et al. .................. 501/34 |
| 5,310,278 A | 5/1994 | Kaczmarczik et al. ........ 404/14 |
| 5,391,015 A | 2/1995 | Kaczmarczik et al. ........ 404/14 |
| 5,402,516 A | 3/1995 | Blyler, Jr. et al. ........... 385/141 |
| 5,536,772 A | 7/1996 | Dillman et al. .............. 524/483 |
| 5,644,669 A | 7/1997 | Oishi et al. .................. 385/123 |
| 5,654,386 A | 8/1997 | Minami et al. .............. 526/281 |
| 5,658,998 A | 8/1997 | Minami et al. .............. 526/281 |
| 5,747,551 A | 5/1998 | Lewandowski et al. ....... 522/95 |
| 5,891,930 A * | 4/1999 | Lapin et al. .................... 522/31 |
| 5,981,064 A | 11/1999 | Burack et al. ................ 428/375 |
| 6,020,408 A | 2/2000 | Suzuki et al. ................ 524/265 |
| 6,054,217 A | 4/2000 | Szum et al. ................. 428/392 |
| 6,242,058 B1 * | 6/2001 | Bahadur et al. ............. 427/515 |
| 6,563,996 B1 | 5/2003 | Winningham ............... 385/128 |
| 6,584,263 B2 | 6/2003 | Fewkes et al. .............. 385/128 |
| 2003/0077059 A1 | 4/2003 | Chien et al. ................. 385/128 |
| 2003/0123839 A1 | 7/2003 | Chou et al. .................. 385/145 |

FOREIGN PATENT DOCUMENTS

| | | | |
|---|---|---|---|
| WO | WO 99/27405 | 6/1999 | ............ G02B/6/44 |
| WO | WO 00/66636 | 11/2000 | ............. C08F/2/48 |
| WO | WO01/49624 | 7/2001 | ........... C03C/25/00 |

OTHER PUBLICATIONS

"Adhesives, 2. Theories of Adhesion", Alphonsus V. Pocius, The 3M Company, Kirk–Othmer Encyclopedia of Chemical Technology, 1991.
"Adhesives, 6. Chemistry and Uses of Adhesives", Alphonsus V. Pocius, The 3M Company, Kirk–Othmer Encyclopedia of Chemical Technology, 1991.
"Development of a Simplified Relationship Between Uniaxial Creep, Stress Relaxation, and Constant Strain–Rate Results for Viscoelastic Polymeric Materials", Richard D. Sudduth, Journal of Applied Polymer Science, vol. 82, p. 527–540, 2001.
"Viscoelastic Window of Pressure–Sensitive Adhesives" E.P. Chang, J. Adhesion, 1991, vol. 34, p. 189–200, 1999.
"Handbook of Pressure Sensitive Adhesive Technology" Third Edition, Donatas Satas, 1989, p. 171–184.
"An Overview of Ultraviolet Light Curable Pressure Sensitive Adhesives, PSAs", Mark Miltry et al., 2000 TAPPI Hot Melt Symposium, p. 37–48.
"UV Curable PSAs", Deborah A. Sciangola, Adhesives Age, Feb. 2000, p. 25–31.
"UV Curable Pressure Sensitive Adhesives" Craig A. Glotfelter, Polymeric Materials Science and Engineering, vol. 72, Spring Meeting 1995, Anaheim California, Proceedings of the American Chemical Society Division of Polymeric Materials: Science and Engineering, p. 587–588.

* cited by examiner

Primary Examiner—James J. Seidleck
Assistant Examiner—Sanza L. McClendon
(74) Attorney, Agent, or Firm—Timothy R. Krogh; Robert L. Carlson

(57) ABSTRACT

The invention includes an optical fiber coating that exhibits the characteristics of a pressure sensitive adhesive. A viscoelastic window for the coating will include at least one set of coordinates that is within Quadrants 2, 3, or 4 or the Transition Flow Region of the Chang viscoelastic of the rheological master curves or will not include at least one set of coordinates that is not within Quadrant 1 of the Chang viscoelastic of the rheological master curves.

43 Claims, 5 Drawing Sheets

OPTICAL FIBER COATINGS WITH PRESSURE SENSITIVE ADHESIVE CHARACTERISTICS

CROSS-REFERENCE TO RELATED APPLICATIONS

This application claims the benefit of U.S. Provisional Application, Ser. No. 60/323,622, filed Sep. 21, 2001, entitled OPTICAL FIBER COATINGS WITH PRESSURE SENSITIVE ADHESIVE CHARACTERISTICS, by Edward J Fewkes, Gregory F Jacobs, Inna I Kouzraina, and Kevin R McCarthy, Huan-Hung Sheng, and Kristi L. Simonton.

FIELD OF THE INVENTION

The present invention relates to the field of optical fibers and particularly to the field of optical fiber coatings.

BACKGROUND OF THE INVENTION

Optical fibers have acquired an increasingly important role in the field of communications, frequently replacing existing copper wires. This trend has had a significant impact in the local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business environments for internal data, voice, and video communications has begun and is expected to increase.

Optical fibers typically contain a glass core, a glass cladding, and at least two coatings, e.g., a primary (or inner) coating and a secondary (or outer) coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled. The secondary coating is applied over the primary coating and functions as a tough, protective outer layer that prevents damage to the glass fiber during processing and use.

SUMMARY OF THE INVENTION

The inventive coatings disclosed have favorable adhesive and mechanical properties such as a low Young's modulus, high elongation and toughness, and good adhesion to the optical fiber glass surface. The inventive coatings also offer flexibility in the commercially available supply of raw materials and low cost raw materials.

An aspect of the invention includes an optical fiber coating. The coating includes a radiation curable composition which comprises a reactive monomer and a photoinitiator. A Chang viscoelastic window of said composition when cured exhibits at least one set of coordinates, the coordinates are in terms of the log of viscous shear modulus (G") and the elastic shear modulus (G') in the units of Pascals, lying within at least one of the following windows defined by the following window sets of coordinates: (1) (about 3.000, about 4.480), (about 3.000, about 3.000), (6.000, about 4.480), and (about 6.000, about 3.000); (2) (greater than about 3.840, about 5.180), (greater than about 3.84, about 4.480), (about 6.000, about 5.180), and (about 6.000, about 4.480); (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); and (5) (about 4.530, about 6.000), (about 4.530, about 5.729), (about 5.112, about 6.000), and (about 5.112, 5.729) or the Chang viscoelastic window of said composition when cured exhibits at least one set of coordinates that does not lie within anyone of the windows defined by the following window sets of coordinates, the coordinates are in terms of the log of viscous shear modulus (G") and the elastic shear modulus (G') in the units of Pascals,: (A) (about 3.000, about 5.180), (about 3.000, about 4.480), (less than about 3.850, about 5.180), and (less than about 3.85, about 4.480); (B) (about 3.000, about 6.000), (about 3.000, about 5.180), (about 4.530, about 6.000), and (about 4.530, about 5.180); and (C) (about 4.530, about 5.729), (about 4.530, about 5.604), (about 5.112, about 5.729), and (about 5.112, about 5.604).

Additional features and advantages of the invention will be set forth in the detailed description which follows, and in part will be readily apparent to those skilled in the art from that description or recognized by practicing the invention as described in the written description and claims hereof, as well as the appended drawings. It is to be understood that both the foregoing general description and the following detailed description are merely exemplary of the invention, and are intended to provide an overview or framework to understanding the nature and character of the invention as it is claimed.

DESCRIPTION OF THE INVENTION

Figure 1:
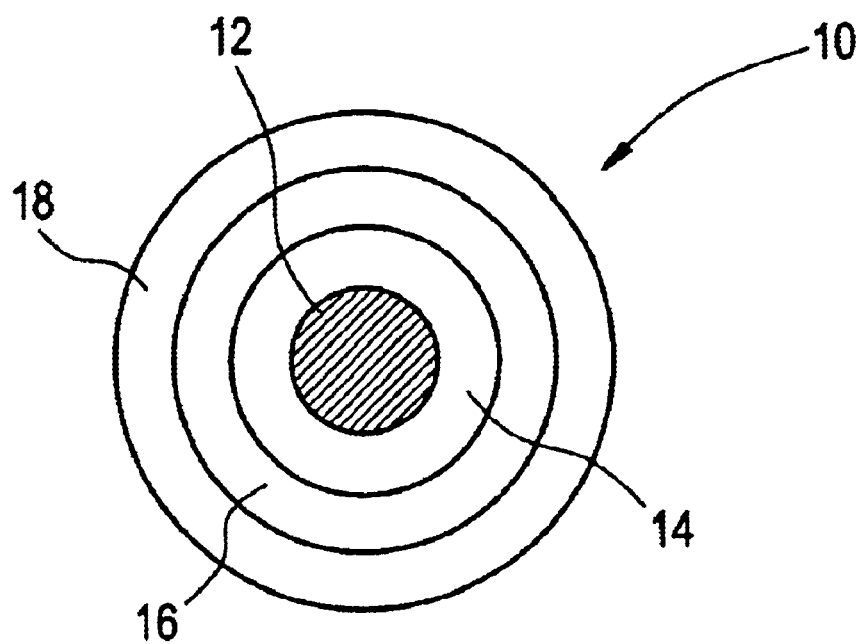
FIG. 1 is a cross section of an optical fiber coated with a dual coating system

Reference will now be made in detail to the present preferred embodiments of the invention, an example of which is illustrated in the accompanying drawings. Wherever possible, the same reference numbers will be used throughout the drawings to refer to the same or like parts. An exemplary embodiment of the optical fiber coating of the present invention is shown in FIG. 1, and is designated generally throughout by reference numeral 10.

Now referring to the drawings, shown in FIG. 1 is a cross sectional view of a coated optical fiber 10. Referring to FIG. 1, the optical fiber 10 includes a glass core 12, a cladding layer 14 surrounding and adjacent to glass core 12, a primary (inner) coating material 16 which adheres to cladding layer 14, and one or more secondary (outer) coating materials 18 surrounding and adjacent to primary coating material 16. The components of the optical fiber of the present invention can optionally include a coloring material, such as a pigment or dye, or an additional colored ink coating may surround coating 18.

Any conventional material can be used to form glass core 12, such as those described in U.S. Pat. No. 4,486,212 to Berkey, which is hereby incorporated by reference. The core is typically a silica glass having a cylindrical cross section and a diameter ranging from about 5 to about 10 μm for single-mode fibers and about 20 to about 100 μm for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

Cladding layer 14 preferably has a refractive index which is less than the refractive index of the core. A variety of cladding materials, both plastic and glass (e.g., silicate and borosilicate glasses) are used in constructing conventional glass fibers. Any conventional cladding materials known in the art can be used to form cladding layer 14 in the optical fiber of the present invention.

A preferred type of fiber is single mode fiber (having a core diameter of less than about 10 μm) with a large effective area, e.g. LEAF®, from Corning, Incorporated of Corning, N.Y.

Fiber Definitions

The effective area is

Aeff=$2\pi(\int E^2 r\, dr)^2/(\int E^4 r\, dr)$, where the integration limits are 0 to ∞, and E is the electric field associated with light propagated in the waveguide. An effective diameter, Deff, may be defined as, Aeff=$\pi(Deff/2)^2$.

By large effective area, we mean that the effective area of the fiber is greater than about 60 μm2, more preferably the effective area of the fiber is greater than about 65 μm2, and most preferably the effective area of the fiber is greater than 70 μm2. It is possible and preferable to have a fiber with an effective area of greater than about 80 to 90 μm2.

The relative refractive index percent, $\Delta\%=100\times(ni^2-nc^2)/2ni^2$, where ni is the maximum refractive index in region i, unless otherwise specified, and nc is the average refractive index of the cladding region unless otherwise specified.

The term α-profile refers to a refractive index profile, expressed in terms of Δ(b)%, where b is radius, which follows the equation, $\Delta(b)\%=\Delta(bo)(1-[|b-bo|]/(b1-bo)]\alpha)$, where bo is the point at which Δ(b)% is maximum, b1 is the point at which Δ(b)% is zero, and b is in the range bi<b<bf, where delta is defined above, bi is the initial point of the α-profile, bf is the final point of the α-profile, and α is an exponent which is a real number. The initial and final points of the α-profile are selected and entered into the computer model. As used herein, if an α-profile is preceded by a step index profile or any other profile shape, the beginning point of the α-profile is the intersection of the α-profile and the step profile or other profile.

Polarization Maintaining Fiber is a fiber that maintains the polarization of light that enters it. For additional background on polarization maintaining fibers pages 72, 73, 252, 253, 418, and 455 of Understanding Fiber Optics, 2nd Edition, ®1993 is incorporated herein by reference in its entirety. An example of polarization maintaining fiber is Panda fiber from Corning Incorporated of Corning, N.Y.

A dispersion compensating fiber is an optical fiber that exhibits both a negative dispersion and a negative dispersion slope. A dispersion compensating fiber may be connected to a transmission fiber, wherein the transmission fiber exhibits a positive dispersion and/or a positive dispersion slope. For additional background regarding a dispersion compensating optical fiber see U.S. patent application Ser. No. 60/304662 filed on or about Jul. 11, 2001. One example of dispersion compensating optical fiber is PureForm™ optical fiber available from Corning Incorporated of Corning, N.Y.

A dispersion managed fiber is an optical fiber that the dispersion exhibited by the fiber alternates by sections of the fiber from positive to negative or negative to positive.

A multi-mode fiber is an optical fiber that transmits or emits multiple modes of light. One example of multi-mode optical fiber is the InfiniCor® line of optical fibers available from Corning Incorporated of Corning, N.Y.

Preferably coating 16 will exhibit characteristics of a pressure sensitive adhesive. These characteristics include coating 16 being a tacky substance and coating 16 exhibits adhesion to a surface under little pressure. One technique to determine the pressure sensitive adhesive characteristics of coating is to produce a plot of viscous shear moduli (G" (dynamic loss modulus)) of a coating (x-axis) vs. the elastic shear moduli (G' (dynamic storage modulus)) of a coating (y-axis) in terms of a Chang viscoelastic window.

Figure 3:
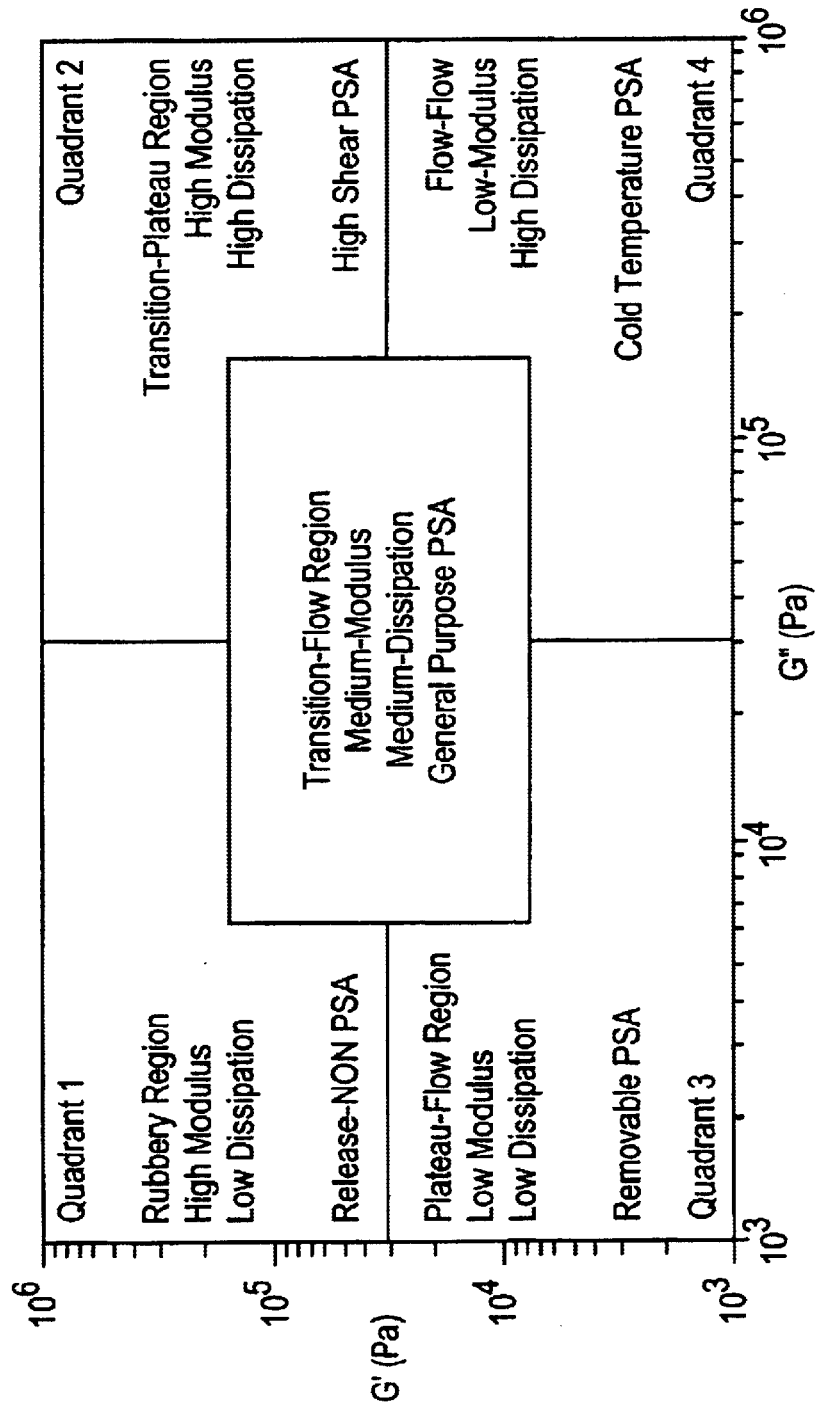
FIG. 3 is an example of a viscoelastic window as related to pressure sensitive adhesives.

The window for a particular coating may be compared to the Chang viscoelastic windows for the different regions of the rheological master curves for pressure sensitive adhesives, FIG. 3. For addition background regarding the Chang viscoelastic window pages 171-84 of Handbook of Pressure Sensitive Adhesive Technology, 3rd Edition D. Satas editor ©1999, is incorporated herein by reference in its entirety. The coordinates of a Chang viscoelastic window may be exhibited as shown in FIG. 3 or on a log scale. The coordinates as shown in FIG. 3 are shown in the units of Pascals. As used herein, a particular set of coordinates of a viscoelastic window will be in terms of Pascals, unless otherwise noted. Quadrant 1 of the window represents coordinates for a coating not having pressure sensitive characteristics and is known as the rubbery region. Characteristics of the coatings include the combination of low dissipation and high modulus. Quadrant 2 is known as the transition-plateau region. The pressure sensitive adhesive characteristics represented by quadrant 2 are high dissipation and high modulus. Quadrant 2 is also known as a high shear pressure sensitive adhesive. Quadrant 3 is known as the removable pressure sensitive adhesive or the plateau flow region. The pressure sensitive adhesive characteristics for this region include low dissipation and low modulus. Quadrant 4 is known as the cold temperature pressure sensitive adhesive or flow-flow region. The characteristics associated with quadrant 4 include low modulus and high dissipation. The window also includes a transition flow region associated with general purpose pressure sensitive adhesives. The representative characteristics include medium modulus and medium dissipation.

Preferably the Chang viscoelastic window for a particular coating will have at least one set of coordinates in quadrants 2, 3, or 4, or the transition-flow region. More preferably, the coating will have at least one set of coordinates within at least one of following windows defined by the following window sets of coordinates, on a log scale: (1) (about 3.000, about 4.480), (about 3.000, about 3.000), (6.000, about 4.480), and (about 6.000, about 3.000); (2) (greater than about 3.840, about 5.180), (greater than about 3.84, about 4.480), (about 6.000, about 5.180), and (about 6.000, about 4.480); (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); and (5) (about 4.530, about 6.000), (about 4.530, about 5.729), (about 5.112, about (6.000), and (about 5.112, about 5.729). It is even more preferred that at least a second set of coordinates of the Chang viscoelastic window of the coating lies within one of the above window sets of coordinates. It is most preferred that at least third set of Chang coordinates lies within one of the above window sets of coordinates.

In one embodiment of the invention, it is preferred that the at least one set of coordinates of composition 16 lies within one of the following second window sets of coordinates: (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); (5) (about 4.530, about 6.000), (about 4.530, about 5.729), (about 5.112, about 6.000), and (about 5.112, about 5.729); (6) (about 5.440, about 5.180), (about 5.440, about 4.480), (about 6.000, about 5.180) and (about 6.000, about 4.480); (7) (greater than about 3.840, about 5.180), (greater than about 3.840, about 3.850), (about 5.440, about 5.180), and (about 5.440, about 3.850); (8) (about 5.440, about 4.480), (about 5.440, about 3.000), (about 6.000, about 4.480), and (about 6.000, about 3.000); (9) (about 4.530, about 3.850), (about 4.530, about 3.000), (about 5.440, about 3.850), and (about 5.440, about 3.000); (10) (about 4.106, about 5.474), (about 4.106, about 5.350), (about 4.930, about 5.474), and (about 4.930, about 5.350); (11) (about 4.232, about 5.375), (about 4.232, about 5.235), (about 4.958, about 5.375), and (about 4.958, about 5.235); and (12) (about 4.139, about 5.488), (about 4.139, about 5.409), (about 4.894, about 5.488), and (about 4.894, about 5.409).

It is more preferred that at least the second set of Chang coordinates lies within one of the following second window sets of coordinates comprising (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); (5) (about 4.530, about 6.000), (about 4.530, about 5.729), (about 5.112, about 6.000), and (about 5.112, about 5.729); (6) (about 5.440, about 5.180), (about 5.440, about 4.480), (about 6.000, about 5.180), and (about 6.000, about 4.480); and (7) greater than about 3.840, about 5.180), (greater than about 3.840, about 3.850), (about 5.440, about 5.180), and (about 5.440, about 3.850). It is even more preferred that the second window sets of coordinates comprises (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); (5) (about 4.530, about 6.000), (about 4.530, about 5.729), (about 5.112, about 6.000), and (about 5.112, about 5.729); and (6) (about 5.440, about 5.180), (about 5.440, about 4.480), (about 6.000, about 5.180), and (about 6.000, about 4.480)

Preferably, the above coordinates of the Chang viscoelastic window are determined at room temperature a strain within the linear viscoelastic region, preferably about 2% or less, more preferably about 1% or less, and at a frequency of about 0.01R/S or about 100 R/S. Optionally the boundaries of each window may comprise G" and G' defined as follows: (G"@ 0.01 R/S, G'@ 0.01 R/S), (G"@ 0.01 R/S, G'@100 R/S), (G"@ 100 R/S, G'@ 0.01 R/S), and (G"@ 100 R/S, G'@ 100 R/S). A dynamic mechanical analyzer such as a DMTA-IV from Rheometric Scientific of Piscataway, N.J. may be used to take the above measurements.

In the case of a fiber that is sensitive to microbending, it is preferred that the fiber has at least one set of coordinates that lie within quadrants 2 or 4, or the Transition Region, more preferably, quadrant 2 or the Transition Region, and most preferably quadrant 2. It is further preferred that the coating has at least two sets of coordinates that lie within quadrant 2, quadrant 4, the Transition Region or some combination thereof. More preferred at least 3 sets of coordinates lie within quadrant 2, quadrant 4, the Transition Region or some combination thereof. Most preferred that all four set of coordinates lie within quadrant 2, quadrant 4, the Transition Region or some combination thereof.

In another embodiment of the invention, at least one of the sets of coordinates a Chang viscoelastic window, on a log scale, of composition 16 when cured does not lie within anyone of the windows defined by the following window sets of coordinates: (A) (about 3.000, about 5.180), (about 3.000, about 4.480), (less than about 3.850, about 5.180), and (less than about 3.85, about 4.480); (B) (about 3.000, about 6.000), (about 3.000, about 5.180), (about 4.530, about 6.000), and (about 4.530, about 5.180); and (C) (about 4.530, about 5.112), (about 4.530, about 5.604), (about 5.112, about 5.729), and (about 5.112, about 5.604). Preferably at least two sets of coordinates of the coating do not lie within anyone of the aforementioned windows (A)-(C), more preferably at least 3 sets of coordinates exhibiting by the coating, and most preferably all four of the set of coordinates exhibited by the coating.

Preferably uncured composition of coating 16 is not a solid at ambient temperatures, more preferably the uncured coating is substantially a liquid at ambient temperatures. It is further preferred that the coating has a finite viscosity at ambient temperatures.

It is further preferred that the composition is a radiation curable composition. Radiation cured as used here in includes, but is not limited to, coatings which may be cured by means of electron beam, electromagnetic radiation (e.g. light), or microwave energy.

A preferred component of the composition of primary coating 16 of the present invention is at least one monomer component. Preferably, the monomer is an ethylenically unsaturated monomer, more preferably a (meth)acrylate monomer. Generally, suitable monomers are those for which the resulting homopolymer would have a glass transition temperature (Tg) of at most about 20° C., preferably at most about 10° C. Generally, a lower molecular weight (i.e., about 120 to 600) liquid (meth)acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups). Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional methacrylates may also be employed.

Suitable ethylenically unsaturated monomers include lauryl acrylate (e.g., SR335 available from Sartomer Company, Inc., Ageflex FA12 available from CPS Chemical Co. (Old Bridge, N.J.), and Photomer 4812 available from Cognis f.k.a. Henkel (Ambler, Pa.)), ethoxylatednonylphenol acrylate (e.g., SR504 available from Sartomer Company, Inc. and Photomer 4003 available from Cognis), caprolactone acrylate (e.g., SR495 available from Sartomer Company, Inc., and Tone M100 available from Union Carbide Company (Danbury, Conn.)), phenoxyethyl acrylate (e.g., SR339 available from Sartomer Company, Inc., Ageflex PEA available from CPS Chemical Co., and Photomer 4035 available from Cognis), isooctyl acrylate (e.g., SR440 available from Sartomer Company, Inc. and Ageflex FA8 available from CPS Chemical Co.), tridecyl acrylate (e.g., SR489 available from Sartomer Company, Inc.), phenoxyglycidyl acrylate (e.g., CN131 available from Sartomer Company, Inc.), lauryloxyglycidyl acrylate (e.g., CN130 available from Sartomer Company, Inc.), isobornyl acrylate (e.g., SR506 available from Sartomer Company, Inc. and Ageflex IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyethoxy)ethyl acrylate (e.g., SR256 available from Sartomer Company, Inc.), and combinations thereof.

A non-exhaustive list of other types of suitable monomers include the following:

(1) R2—R1-O—(CH2CH3CH—O)n-COCH=CH2,;
(2) R1—O—(CH2CH3CH—O)n-COCH=CH2;
(3) R2—R1-O—(CH2CH2CH2—O)n-COCH=CH2;
(4) [(CH2CH3CH—O)n-(R3 CH2—O)b]xH;
(5) [(CH2(R3)CH—O)n-(CH2CH2—O)b]xH; and
(6) [(CH2R4CH—O)n-(R3 CH2—O)b]xH.

Where R1 and R2 are aliphatic or aromatic or mixtures of both, and n=1 to 10 and R3 and R4 can be an alkyl or alkylene oxide group which can be acrylated to provide mono or multifunctional acrylates. The coefficients "a", "b", and "x" can be any positive whole integer. Preferably each co-monomer includes at least one n-propyl, isopropyl, or substituted isopropyl group. Examples of a monomer with a substituted isopropyl group are shown below:

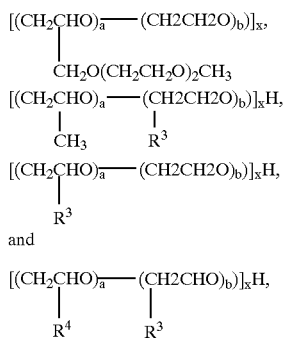

and where R3 and R4 are alkyl, alkyl oxide, or alkylene oxide groups that can be acrylated to provide mono- or multifunctional acrylates.

When it is desirable to utilize moisture-resistant components, the monomer component will be selected on the basis of its compatibility with the selected moisture-resistance oligomer. For satisfactory coating compatibility and moisture resistance, it is desirable to use a liquid acrylate monomer component comprising a predominantly saturated aliphatic mono- or di-acrylate monomer or alkoxy acrylate monomers.

Thus, it is desirable for the primary coating composition to contain at least one ethylenically unsaturated monomer, although more than one monomer can be introduced into the composition. Preferably, the ethylenically unsaturated monomer is present in an amount between about 10 to about 90 percent by weight, more preferably between about 20 to about 60 percent by weight, and most preferably between about 25 to about 45 percent by weight.

Furthermore, the coating compositions of the invention may typically include at least one component with a higher molecular weight than that of the monomer. Examples of such components include a polymer or an oligomer.

The polymer can be a block copolymer including at least one hard block and at least one soft block, wherein the hard block has a Tg greater than the Tg of the soft block. For the purposes of the present invention, a hard block has a Tg greater than about 20° C. and a soft block has a Tg of less than about 20° C. Tg may be determined in accordance by DMA at a frequency of 1 Hz. Tg is defined as the temperature at which the loss tangent (tan δ) is a maximum as a function of temperature. Preferably the soft block backbone is aliphatic. Suitable aliphatic backbones include poly (butadiene), polyisoprene, polyethylene/butylene, polyethylene/propylene, and diol blocks. One example of a block copolymer is a di-block copolymer having the general structure of A-B. However, the invention is not limited to a di-block copolymer, a further example of a suitable copolymer is a tri-block having the general structure A-B-A. Preferably the mid block has a molecular weight of at least about 10,000, more preferably more than about 20,000, still more preferably more than about 50,000, and most preferably more than about 100,000. In the case of a tri-block copolymer (A-B-A), the mid-block (B, such as butadiene in a SBS copolymer as defined herein) has a Tg of less than about 20° C. An example of a multi-block copolymer, having more than 3 blocks includes a thermoplastic polyurethane (TPU). Sources of TPU include BASF, B. F. Goodrich, and Bayer. The block copolymer may have any number of multiple blocks. In accordance with one embodiment, the composition includes a polymer component having at least two thermoplastic terminal end blocks and an elastomeric mid block backbone between the two end blocks. The composition further includes the at least one reactive monomer. A thermoplastic is a polymer which softens and can be made to flow when it is heated. The thermoplastic polymer hardens on cooling and retains the shape imposed at elevated temperature.

The polymer component may or may not be chemically cross-linked when cured. Preferably, the polymer is a thermoplastic elastomer polymer. Preferably, the component has at least two thermoplastic terminal end blocks and an elastomeric backbone between two of the end blocks. The composition can include a polymer component in an amount of from about 5% by wt. to about 95% by wt., preferably from about 10% by wt. to about 30% by wt., and most preferably from about 12% by wt. to about 20% by wt. It is preferred that the polymer is present in at least about 10% or more, more preferably more than about 10%.

Suitable thermoplastic terminal end block materials include polystyrene and polymethyl methacrylate. The thermoplastic material is preferably a high polymer above its entanglement molecular weight. The entanglement molecular weight is the molecular weight at which the effects of neighboring molecules on molecular motion of the subject molecule can no longer be described solely in terms of local frictional forces. Viscoelastic properties reveal a strong additional coupling to the neighboring molecules. The subject molecule acts as though it were localized at a few widely separated points along the subject molecule's molecular chain. For additional background regarding entanglement molecular weight, see pages 103–107 and 116–120 of Hiemenz (1984) Polymer Chemistry: The Basic Concepts, (New York, N.Y.). The basic concepts are incorporated herein by reference.

In accordance with one embodiment of the polymer, coating 16 includes a first component having at least two thermoplastic terminal end blocks and an elastomeric backbone between the two end blocks and a second component which may be cross-linked to the first component, e.g. the second component may be the monomer which polymerizes when the coating is cured. If the above first component has a reactive group, for example butadiene present in the mid-block, polymerization could occur wherein the mid-block participates in the polymerization reaction. Alternatively, if the mid-block is non-reactive, such as a hydrogenated polybutadiene, the second component may polymerize and cross-link through and around the first component, rather than to the first component.

The present invention can be illustrated by the optical waveguide coating formulations which include the chemical components as recited below. However, it is to be understood that any reference to a specific composition is given by way of example only and is not to be restrictive of the invention, as claimed. One embodiment includes the use of styrenic block copolymers ("SBC") in radiation curable optical fiber coating compositions also including a mixture of acrylate monomers, and a photoinitiator. While the concept has been demonstrated using acrylate functional monomers, other ethylenically unsaturated monomers could also be used. Preferably the other acrylate monomers are capable of dissolving the elastomers. Besides "SBC", other thermoplastic elastomers may be used. Preferably the elastomer is suitable to be dissolved in the monomer and enables the coating to be radiation cured. Suitable mid blocks include ethylene propylene diene monomer ("EPDM") and ethylene propylene rubber. The elastomeric mid-block can be polybutadiene for the SBS series, polyisoprene for the SIS series, polyethylene/butylene for the SEBS series and polyethylene/propylene for the SEP series of copolymers. SBC's combine the properties of both thermoplastic materials and elastomers and are also known as Thermoplastic Elastomers (TPE).

Preferably, the styrenic block copolymers contain a backbone chain made up of three segments: elastomeric mid-block and two thermoplastic end-blocks. Among commercially available block copolymer structures are polybutadiene (SBS series), polyisoprene (SIS), polyethylene/butylene (SEBS), and polyethylene/propylene (SEP).

Examples of commercially available styrenic block copolymers are Kraton® (Kraton Polymers, Houston Tex.), Calprene® (Repsol Quimica S. A. Corporation, Spain), Solprene® (Phillips Petroleum Co), Stereon® from Firestone Tire & Rubber Co., Akron, Ohio, Kraton D1101 (Styrene-Butadiene linear block copolymer—SBS), Kraton Polymers, Houston, Tex., Kraton D1193 (Styrene-Isoprene linear block copolymer—SIS), Kraton Polymers, Houston, Tex., Kraton FG1901X (Styrene-ethylene-butylene block polymer—S-EB-S, grafted with about 2% w maleic anhydride), Kraton Polymers, Houston, Tex., Kraton D1107 (Styrene-Isoprene linear block copolymer—SIS) Kraton Polymers, Houston, Tex., and Isolene400 Hardman Isolene© (liquid polyisoprene), Elementis Performance Polymers, Belleville, N.J. In the neat state, these thermoplastic elastomers possess a double-phased morphology with a network made of physical crosslinks.

Polymers may also include homopolymers such as liquid polyisoprene. One example of a suitable homopolymer is Hardman Isolene® 400 from Elementis Performance polymers of Belleville, N.J.

In the case that the coating formulation includes an oligomer, preferably the oligomer is an ethylenically unsaturated oligomer, more preferably a (meth)acrylate oligomer. By (meth)acrylate, it is meant an acrylate or a methacrylate. The (meth)acrylate terminal groups in such oligomers may be provided by a monohydric poly(meth)acrylate capping component, or by a mono(meth)acrylate capping component such as 2-hydroxyethyl acrylate, in the known manner. It is also preferred that the oligomer is capable of participating in addition polymerization.

Urethane oligomers are conventionally provided by reacting an aliphatic or aromatic diisocyanate with a dihydric polyether or polyester, most typically a polyoxyalkylene glycol such as a polyethylene glycol. Such oligomers typically have 4–10 urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference, describe such syntheses of the oligomers in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

Polyurea components may be incorporated in oligomers prepared by these methods, Simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently nonpolar and saturated as to avoid compromising the moisture resistance of the system.

Thus, it is desirable for the primary coating composition of the present invention to contain at least one ethylenically unsaturated oligomer, although more than one oligomer component can be introduced into the composition. Preferably, the oligomer(s) is present in an amount between about 10 to about 90 percent by weight, more preferably between about 35 to about 75 percent by weight, and most preferably between about 40 to about 65 percent by weight.

Suitable ethylenically unsaturated oligomers for primary coatings include polyether urethane acrylate oligomers (e.g., CN986 available from Sartomer Company, Inc., (West Chester, Pa.)) and BR3731 and STC3-149 available from Bomar Specialties Co. (Winsted, Conn.)), acrylate oligomers based on tris(hydroxyethyl)isocyanurate, (available from Sartomer Company, Inc.), (meth)acrylated acrylic oligomers, (available from Cognis (Ambler, Pa.), polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690, 502 and 4,798,852 to Zimmerman et al., U.S. Pat. No. 4,609,718 to Bishop, and U.S. Pat. No. 4,629,287 to Bishop et al., all of which are hereby incorporated by reference), polyether acrylate oligomers (e.g., Genomer 3456 available from Rahn A G (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,1529,287 to Bishop et al., the specifications of which are hereby incorporated by reference), epoxy acrylate oligomers (e.g., CN120 available from Sartomer Company, Inc., and Ebecryl 3201 and 3604 available from UCB Radcure), hydrogenated polybutadiene oligomers (e.g., Echo Resin MBNX available from Echo Resins and Laboratory (Versailles, Mo.)), and combinations thereof.

Optical fiber coating compositions may also contain a polymerization initiator which is suitable to cause polymerization (i.e., curing) of the composition after its application to a glass fiber. Polymerization initiators suitable for use in the primary coating compositions of the present invention include thermal initiators, electron beam initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, must provide reasonable cure speed without causing premature gelation of the coating composition. A desirable cure speed is any speed sufficient to cause substantial curing of the coating materials. As measured in a dose versus modulus curve, a cure speed for coating thicknesses of about 25–35 µm is, e.g., less than 1.0 J/cm2, preferably less than 0.5 J/cm2.

Suitable photoinitiators include 1-hydroxycyclohexylphenyl ketone (e.g., Irgacure 184 available from Ciba Specialty Chemical (Hawthorne, N.Y.), (2,6-dimethoxybenzoyl)-2,4,4-trimethylpentyl phosphine oxide (e.g., commercial blends Irgacure 1800, 1850, and 1700 available from Ciba Specialty Chemical), 2,2i-dimethoxyl-2-phenyl acetophenone (e.g., Irgacure 651, available from Ciba Specialty Chemical), bis(2,4,6-trimethyl benzoyl)phenyl-phosphine oxide (Irgacure 819), (2,4,6-trimethylbenzoyl)diphenyl phosphine oxide (Lucerin TPO, available from BASF (Munich, Germany)), ethoxy (2,4,6-trimethylbenzoyl)phenyl phosphine oxide (Lucerin TPO-L from BASF), and combinations thereof.

As used herein, the weight percent of a particular component refers to the amount introduced into the bulk composition excluding the adhesion promoter and other additives. The amount of adhesion promoter and various other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

The coating composition may also include an adhesion promoter. Preferred adhesion promoters includes compounds that have at least one reactive silane, reactive titanate, reactive zirconate, or combinations thereof. A preferred example of a silane adhesion promoter includes a compound containing a cyclic structure interposed between at least two reactive silanes which are independently an alkoxysilane or a halosilane, e.g., bis(trimethoxysilylethyl) benzene or bis(triethoxysilylethyl)benzene. Bis (trimethoxysilylethyl)-benzene is commercially available from Gelest (Tellytown, Pa.) and United Chemical Technologies, Inc. (Bristol, Pa.). Bis(triethoxysilylethyl) benzene can be synthesized from bis(trimethoxysilylethyl) benzene by trans-esterification with ethanol.

Some other preferred silane adhesion promoters include 3-Acryloxypropyltrimethoxysilane from Gelest, 3-Methacryloxypropyltrimethoxysilane, aminopropyltrimethoxysilane, vinyl trimethoxysilane, and allyl trimethoxysilane, and 3-Mercaptopropyltrimethoxysilane from Gelest.

In case that the adhesion promoter consists of a titanate containing compound, the promoter optionally consists of at least one ethylenically unsaturated titanate containing compound, and more preferably at least one neoalkoxy titanate containing compound. Most preferably, the titanate containing compound consists of least one of the following group of compounds consisting of tetra (2,2 diallyoxymethyl)butyl, di(ditridecyl)phosphito titanate (commercially available as KR 55, from Kenrich Petrochemcials, Inc. (hereinafter Kenrich) Bayonne, N.J.), neopentyl(diallyl)oxy, trineodecanonyl titanate (commercially available as LICA 01 from Kenrich), neopentyl(diallyl)oxy, tri(dodecyl)benzene-sulfony titanate (commercially available as LICA 09 from Kenrich), neopentyl(diallyl)oxy, tri(dioctyl)phosphato titanate (commercially available as LICA 12 from Kenrich), neopentyl(dially)oxy, tri(dioctyl)pyro-phosphato titanate (commercially available as LICA38 from Kenrich), neopentyl(diallyl)oxy, tri(N-ethylenediamino)ethyl titanate (commercially available as LICA 44 from Kenrich), neopentyl(diallyl)oxy, tri(m-amino)phenyl titanate (commercially available as LICA 97 from Kenrich), neopentyl(diallyl)oxy, trihydroxy caproyl titanate (formerly available as LICA 99 from Kenrich), and mixtures thereof.

Preferably, the titanate containing compound contains at least one UV curable functional group. More preferably, the functional group is a (meth)acrylate or acrylate functional group. However, the titanate containing compound is not required to include a UV curable group.

In case that the adhesion promoter consists of a zirconate containing compound, preferably the promoter consists of at least one ethyleneically unsaturated zirconate containing compound, and more preferably at least one neoalkoxy zirconate containing compound. Most preferably, the titanate containing compound consists of least one of the following group of compounds consisting of tetra (2, 2 diallyloxymnethyl)butyl, di(ditridecyl)phosphito zirconate (commercially available as KZ 55 from Kenrich), neopentyl (diallyl)oxy, trineodecanoyl zirconate (commercially available as NZ 01 from Kenrich), neopentyl(diallyl)oxy, tri (dodecyl)benzene-sulfony zirconate (commercially available as NZ 09 from Kenrich), neopentyl(diallyl)oxy, tri(dioctyl)phosphato zirconate (commercially available as NZ 12 from Kenrich), neopentyl(diallyl)oxy, tri(dioctyl) pyro-phosphato zirconate (commercially available as NZ 38 from Kenrich), neopentyl(diallyl)oxy, tri(N-ethylenediamino)ethyl zirconate (commercially available as NZ 44 from Kenrich), neopentyl(diallyl)oxy, tri(m-amino) phenyl zirconate (commercially available as NZ 97 from Kenrich), neopentyl(diallyl)oxy, trimethacryl zirconate (commercially available as NZ 33 from Kenrich), neopentyl (diallyl)oxy, triacryl zirconate (formerly available as NZ 39 from Kenrich), dineopentyl(diallyl)oxy, diparamino benzoyl zirconate (commercially available as NZ 37 from Kenrich), dineopentyl(aiallyl)oxy, di(3-mercapto) propionic zirconate (commercially available as NZ 66A from Kenrich), and mixtures thereof.

Preferably, the zirconate containing compound contains at least one UV curable functional group. More preferably, the functional group is a (meth)acrylate or acrylate functional group. However, the zirconate containing compound is not required to include a UV curable group.

Preferably the adhesion promoter is present in an amount between about 0.1 to about 10 parts per hundred, more preferably between about 0.25 to about 4 parts per hundred, most preferably between about 0.5 to about 3 parts per hundred.

In addition to the above-described components, the primary coating composition of the present invention can optionally include any number of additives, such as reactive diluents, antioxidants, catalysts, lubricants, co-monomers, low molecular weight non-crosslinking resins, and stabilizers. Some additives (e.g. chain transfer agents, for example) can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation).

A preferred catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

A preferred antioxidant is thiodiethylene bis(3,5-di-tert-butyl)-4-hydroxyhydrocinnamate (e.g., Irganox 1035, available from Ciba Specialty Chemical).

A preferred co-monomer is the polar monomer N-vinylpyrrolidone available from International Specialty Products (Wayne, N.J.).

Another aspect of the present invention relates to a composition that contains an oligomer capable of being polymerized, a monomer suitable to control the viscosity of the composition, an adhesion promoter that includes a compound containing a reactive silane, and a carrier.

The carrier is preferably a carrier which functions as a carrier surfactant or ambiphilic reactive or non-reactive surfactant. Reactive surfactants which are partially soluble or insoluble in the composition are particularly preferred. Without being bound to a particular theory, it is believed that carriers which function as reactive surfactants interact with the compound containing a reactive silane by depositing such compounds on the glass fiber, where it is allowed to react. It is desirable for the carrier to be present in an amount between about 0.01 to about 10 parts per hundred, more preferably about 0.25 to about 3 parts per hundred.

Suitable carriers, more specifically carriers which function as reactive surfactants, include polyalkoxypolysiloxanes. A preferred carrier is available from Goldschmidt Chemical Co. (Hopewell, Va.) under the tradename Tegorad 2200, and reactive surfactant Tegorad 2700 (acrylated siloxane) also from Goldschmidt Chemical Co.

Other classes of suitable carriers are polyols and non-reactive surfactants. Examples of suitable polyols and non-reactive surfactants include polyol Aclaim 3201 (poly(ethylene oxide-co-propylene oxide)) available from Bayer (formerly known as Lyondel), Newton Square, Pa., and non reactive surfactants Tegoglide 435 (polyalkoxy-polysiloxane) available from Goldschmidt Chemical Co. The polyol or non-reactive surfactants may be present in a preferred amount between about 0.01 pph to about 10 pph.

Suitable carriers may also be amphiphilic molecules. An amphiphilic molecule is a molecule that has both hydrophilic and hydrophobic segments. The hydrophobic segment may alternatively be described as a lipophilic (fat/oil loving) segment.

A tackifier is also an example of a suitable carrier. In addition to being a carrier, a tackifier can also be a molecule that is capable of modifying the time-sensitive rheological property of a polymer product. In general a tackifier additive will make a polymer product act stiffer at higher strain rates or shear rates and will make the polymer product softer at low strain rates or shear rates. A tackifier is an additive commonly used in the adhesives industry, that enhances the ability of a coating to create a bond with an object that the coating is applied upon. For additional background regarding tackifiers and tackifier resins, the Handbook of Pressure Sensitive Adhesive Technology, 3rd Edition, (Warwick, R.I.) (1999) is incorporated herein by reference, see pages 36, 37, 57–61, 169, 171–184, and 609–631.

Preferred tackifiers are those classified as a terpene base resin, coumarone base resin, petroleum resin, hydrogenated petroleum resin, styrene resin, phenol resins, or rosin base resin. It is preferred that the tackifiers are nonepoxidized. The rosin base resins include unmodified rosin (e.g., wood, gum, or tall oil) and rosin derivatives. Rosin base resins can be classified by their rosin acids, which are either an abietic acid or a pimaric acid. Abietic acid type rosins are preferred. Rosin derivatives include polymerized rosin, disproportionated rosin, hydrogenated rosin, and esterified rosin. Representative examples of such rosin derivatives include pentaerythritol esters of tall oil, gum rosin, wood rosin, or mixtures thereof.

The terpene base resins include terpene polymers of α-pinene, β-pinene, dipentel, limonene, myrcene, bornylene and camphene, and phenol-modified terpene base resins obtained by modifying these terpene base resins with phenols.

The coumarone base resins include, for example, coumarone-indene resins and phenol-modified coumarone-indene resins.

Petroleum and hydrogenated petroleum resins include aliphatic petroleum resins, alicyclic petroleum resins, aromatic petroleum resins using styrene, α-methylstyrene, vinyltoluene, indene, methylindene, butadiene, isoprene, piperylene and pentylene as raw materials, and homopolymers or copolymers of cyclopentadiene. The petroleum resins are polymers using fractions having a carbon number of 5 to 9 as main components.

The styrene base resins include homopolymers which are low molecular weight polymers comprising styrene as a principal component, and copolymers of styrene with, for example, α-methylstyrene, vinyltoluene, and butadiene rubber.

The phenol base resins include reaction products of phenols such as phenol, cresol, xylenol, resorcinol, p-tert-butylphenol, and p-phenylphenol with aldehydes such as formaldehyde, acetaldehyde and furfural, and rosin-modified phenol resins.

A more preferred tackifier is Uni-tac® R-40 (hereinafter "R-40") available from International Paper Co., Purchase, N.Y. R-40 is a tall oil rosin, which contains a polyether segment, and is from the chemical family of abietic esters. Preferably, the tackifier is present in the composition in an amount between about 0.01 to about 10 parts per hundred, more preferred in the amount between about 0.05 to about 10 parts per hundred. A suitable alternative tackifier is the Escorez series of hydrocarbon tackifiers available from Exxon. The aforementioned carriers may also be used in combination. Other preferred tackifiers include Sylvatac RE-40N (Rosin Ester) from Arizona Chemical Co., Jacksonville, Fla., Sylvatac RE-40 (Rosin Ester) from Arizona Chemical Co., Nevtac 10 (aliphatic hydrocarbon resin) from Neville Chemical Co., Neville Island, Pa., and Piccovar AP10 (aromatic hydrocarbon resin) from Eastman Chemical Co., Kingsport, Tenn.

Preferably the adhesion promoter used in combination with the tackifier carrier is a poly(alkoxy)silane. However, the invention is not limited to only a poly(alkoxy)silane adhesion promoter in combination with a tackifier carrier. A preferred poly(alkoxy)silane adhesion promoter is bis (trimethoxysilylethyl)benzene. It is also preferred that the poly(alkoxy)silane adhesion promoter is present in the composition in an amount between 0.1 to 10 pph.

Although the adhesion promoter can be any adhesion promoter that includes a compound with a reactive silane, preferably it is an adhesion promoter as described above (i.e., including a compound containing a cyclic structure interposed between at least two reactive silanes, which are independently alkoxysilanes or halosilanes). Other suitable adhesion promoters are described in U.S. Pat. Nos. 4,921, 880 and 5,188,864 to Lee et al., the specifications of which are hereby incorporated by reference.

Reference is made to U.S. patent application Ser. No. 09/476,151, filed Dec. 30, 1999, the specification of which is incorporated herein by reference as though fully set forth in its entirety, for a more detailed explanation of the adhesion promoter.

The primary coating is a soft cushioning layer which preferably has a Young's modulus of less than about 5 MPa, more preferably less than about 1.2 MPa, most preferably less than about 0.9 MPa.

Preferably the percent elongation comprises at least about 100%, more preferably more than about 131%, even more preferably more than about 140%, and most preferably at least about 150%. The percent elongation may comprises as much as more than about 175% or more than about 200%.

In one embodiment of coating 16, the Young's modulus comprises less than about 0.65 MPa and a percent elongation comprises more than about 140%, more preferably the Young's modulus comprises about 0.5 MPa or less and more preferably the percent elongation comprises at least 150%, and most preferably at least about 200% percent elongation.

In another embodiment of coating 16, the coating comprises a composition substantially devoid of a tackifier. In an additional embodiment of coating 16, the coating comprises a composition substantially devoid of a polymer.

The secondary coating material 18 is typically the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, the specifications of which are hereby incorporated by reference. Various additives that enhance one or more properties of the coating can also be present, including the above-mentioned additives incorporated in the compositions of the present invention.

Typical secondary coatings will include at least one UV curable monomer and at least one photoinitiator. The secondary coating may also include about 0–90 weight percent of at least one UV curable oligomer. It is preferred that the secondary coating is not a thermoplastic resin. Preferably, both the monomer and the oligomer are compounds capable of participating in addition polymerization. The monomer or the oligomer may be the major component of the secondary coating. An example of a suitable monomer is an ethylenically unsaturated monomer. Ethylenically unsaturated monomers may contain various functional groups, which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Cognis Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Cognis Corp., and SR499, Sartomer Company, Inc.), propoxylated trimethylolpropane triacrylate with propoxylation being 3 or greater, preferably ranging from 3 to 30 (e.g., Photomer 4072, Cognis Corp. and SR492, Sartomer), and ditrimethylolpropane tetraacrylate (e.g., Photomer 4355, Cognis Corp.); alkoxylated glyceryl triacrylates such as propoxylated glyceryl triacrylate with propoxylation being 3 or greater (e.g., Photomer 4096, Cognis Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Cognis Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether and the like (e.g., Photomer 3016, Cognis Corp.); and single and multi-ring cyclic aromatic or non-aromatic polyacrylates such as dicyclopentadiene diacrylate and (dicyclopentane diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

As indicated above, an optional constituent of the secondary coating composition is the oligomeric component. The oligomeric component can include a single type of oligomer or it can be a combination of two or more oligomers. When employed, if at all, the oligomeric component introduced into the compositions of the present invention preferably comprises ethylenically unsaturated oligomers When employed, suitable oligomers can be either monofunctional oligomers or polyfunctional oligomers, although polyfunctional oligomers are preferred. The oligomeric component can also be a combination of a monofunctional oligomer and a polyfunctional oligomer.

Di-functional oligomers preferably have a structure according to formula (I) below:

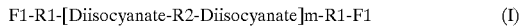
F1-R1-[Diisocyanate-R2-Diisocyanate]m-R1-F1     (I)

where F1 is independently a reactive functional group such as acrylate, methacrylate, acrylamide, N-vinyl amide, styrene, vinyl ether, vinyl ester, or other functional group known in the art; R1 includes independently —C2-12O—, —(C2-4-O)n-, —C2-12O—(C2-4-O)n-, —C2-12O—(CO—C2-5O)n-, or —C2-12O—(CO—C2-5NH)n- where n is a whole number from 1 to 30, preferably 1 to 10; R2 is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to R2 and/or R1.

Other polyfunctional oligomers preferably have a structure according to formula (II) or formula (III) as set forth below:

multiisocyanate-(R2-R1-F2)x     (II)

or

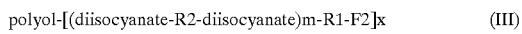
polyol-[(diisocyanate-R2-diisocyanate)m-R1-F2]x     (III)

where F2 independently represents from 1 to 3 functional groups such as acrylate, methacrylate, acrylamide, N-vinyl amide, styrene, vinyl ether, vinyl ester, or other functional groups known in the art; R1 can include —C2-12O—, —(C2-4-O)n-, —C2-12O—(C2-4-O)n-, —C2-C2-12O—(CO—C2-5O)n-, or —C2-12O—(CO—C2-5NH)n- where n is a whole number from 1 to 10, preferably 1 to 5; R2 can be polyether, polyester, polycarbonate, polyamide, polyurethane, polyurea or combinations thereof; x is a whole number from 1 to 10, preferably 2 to 5; and m is a whole number from 1 to 10, preferably 1 to 5. In the structure of formula II, the multiisocyanate group is the reaction product formed following bonding of a multiisocyanate to R2. Similarly, the diisocyanate group in the structure of formula III is the reaction product formed following bonding of a diisocyanate to R2 and/or R1.

Urethane oligomers are conventionally provided by reacting an aliphatic diisocyanate with a dihydric polyether or polyester, most typically a polyoxyalkylene glycol such as a polyethylene glycol. Such oligomers typically have between about four to about ten urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference to describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from about 2–250 carbon atoms and, preferably, are substantially free of ether or ester groups.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently nonpolar and saturated as to avoid compromising the moisture resistance of the system.

Suitable oligomers include BR301 is an aromatic urethane acrylate oligomer available from Bomar Specialty Co., Photomer 6010 is an aliphatic urethane acrylate oligomer available from Henkel Corp., KWS5021 is an aliphatic urethane acrylate oligomer available from Bomar Specialty Co., RCC12-892 is a multi-functional aliphatic urethane acrylate oligomer available from Henkel Corp., RCC13-572 is an aromatic urethane diacrylate oligomer available from Henkel Corp., and KWS4131 is an aliphatic urethane acrylate oligomer available from Bomar Specialty Co.

Optical fiber secondary coating compositions may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably, 95% of the coating composition. As measured in a dose versus modulus curve, a cure speed for coating thicknesses of about 25–35 $\mu$m is, e.g., less than 1.0 J/cm2, preferably less than 0.5 J/cm2. It is preferred that the secondary coating composition contains about 10–90% of the monomer; of about 0–90% of the oligomer; and about 0.5–10% of the photoinitiator.

Suitable photoinitiators include, without limitation, 1-hydroxycyclohexylphenyl ketone (e.g., Irgacure 184 available from Ciba Specialty Chemical (Tarrytown, N.Y.)), (2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxy-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical) and combinations thereof. Other photoinitiators are continually being developed and used in coating compositions on glass fibers. Any suitable photoinitiator can be introduced into compositions of the present invention.

In addition to the above-described components, the secondary coating composition of the present invention can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

A preferred antioxidant is thiodiethylene bis(3,5-di-tert-butyl)-4-hydroxyhydrocinnamate (e.g., Irganox 1035, available from Ciba Specialty Chemical).

Other suitable materials for use in secondary coating materials, as well as considerations related to selection of these materials are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention. Reference is made to U.S. patent application Ser. No. 60/173,874, filed Dec. 30, 1999, and Provisional U.S. Patent Application filed Jul. 26, 2000 by Botelho et al., titled Secondary Coating Compositions for Optical Fibers, the specifications of which are incorporated herein by reference as though fully set forth in its entirety, for a more detailed explanation of secondary coatings. Preferably, secondary coating 18 has a Young's modulus of at least about 50 MPa, more preferably at least about 500 MPa, and most preferably at least about 1000 MPa. In one embodiment of fiber 10, the outer diameter of secondary coating 18 is about 245 $\mu$m. However, the outer diameter of coating 18 is not limited to about 245 $\mu$m. Particular embodiments of coating 18 may have an outer diameter of less than or greater than about 245 $\mu$m, e.g. about 150 $\mu$m, 175 $\mu$m, 200 $\mu$m, 275 $\mu$m, 300 $\mu$m, or 350 $\mu$m.

Secondary coating 18 can be a tight buffer coating or, alternatively, a loose tube coating. Irrespective of the type of secondary coating employed, it is preferred that the outer surface of secondary coating 18 not be tacky so that adjacent convolutions of the optic fiber (i.e., on a process spool) can be unwound.

The optical fibers of the present invention can also be formed into an optical fiber ribbon which contains a plurality of substantially aligned, substantially coplanar optic fibers encapsulated by a matrix material. The matrix material can be made of a single layer or of a composite construction. Suitable matrix materials include polyvinyl chloride or other thermoplastic materials as well as those materials known to be useful as secondary coating materials. In one embodiment, the matrix material can be the polymerization product of the composition used to form the secondary coating material.

Briefly, the process for making a coated optical fiber in accordance with the invention involves fabricating glass fiber 10 (core 12 and cladding layer 14), coating the glass fiber with the primary coating composition of the present invention, and polymerizing the composition to form the primary coating material 16. Optionally, secondary coating composition 18 can be applied to the coated fiber either before or after polymerizing the primary coating. When applied after polymerizing the primary coating, a second polymerization step must be employed. The primary and optional secondary coating compositions are coated on a glass fiber using conventional processes.

It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. The primary coating and secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the un-cured coating composition on the glass fiber to heat or ultraviolet light or electron beam, depending upon the nature of the coating composition(s) and polymerization initiator being employed. It is frequently advantageous to apply both the primary coating composition and any secondary coating compositions in sequence following the draw process. Methods of applying dual layers of coating compositions to a moving glass fiber are disclosed in U.S. Pat. No. 4,474,830 to Taylor and U.S. Pat. No. 4,851,165 to Rennell et al., the specification of which are hereby incorporated by reference. Of course, the primary coating composition can be applied and cured to form the primary coating material 16, then the secondary coating composition(s) can be applied and cured to form the secondary coating material 18.

Figure 2:
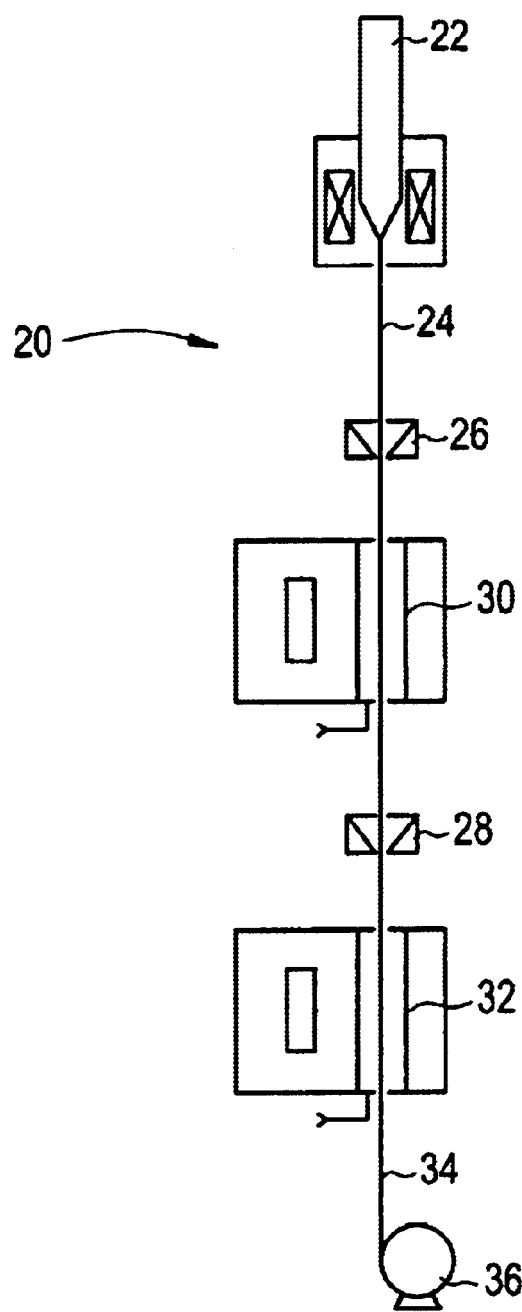
FIG. 2 is a schematic of a process for drawing and coating an optical fiber with a dual coating system.

One embodiment of a process for manufacturing a coated optical fiber in accordance with the invention is further described in FIG. 2, generally denoted as 20. As shown in FIG. 2, a sintered preform 22 (shown as a partial preform) is drawn into an optical fiber 24. The fiber 24 passes through coating elements 26 and 28. Preferably, coating 16 is applied to fiber 24 in element 26 and coating 18 is applied to fiber 24 in element 28. Curing element 30 is located downstream from element 26 and curing element 32 is located downstream from element 28 to cure the coatings applied to fiber 24. Alternatively, the coating applied in element 26 may be cured subsequently to fiber 24 passing through element 28. Tractors 36 are used to pull a coated optical fiber 34 through element 32.

EXAMPLES

The invention will be further clarified by the following examples which are intended to be exemplary of the invention.

Various test coatings with the characteristics of a pressure sensitive adhesive were prepared. The test coatings and a control coating are listed be in tables I and II. The percentages in tables I and II are weight percents, unless indicated otherwise.

TABLE I

Urethane acrylate-based formulations

| Test coatings | mono-% | Di-% | Oligo-% | PI-% | AP-(pph) | Add-(pph) | Add-(pph) |
|---|---|---|---|---|---|---|---|
| Test coating 1 | Ph4003-40 | Ph4127-5 | BR3731-52 | Irg 184-1.5 Irg 819-1.5 | Acryl Sil-(1.0) 3-Mer-(.3) | Irganox 1035-(1.0) | Sylvatac RE-40N-(20) |
| Test coating 2 | Ph4003-43 | Ph4127-2 | BR3731-52 | Irg 184-1.5 Irg 819-1.5 | Acryl Sil-(1.0) 3-Mer-(.3) | Irganox 1035-(1.0) | Sylvatac RE-40N-(15) |
| Test coating 3 | Ph4003-40 | Ph4127-5 | BR3731-52 | Irg 184-1.5 Irg 819-1.5 | Acryl Sil-(1.0) | Irganox 1035-(1.0) | Sylvatac RE-40N-(20) |
| Test coating 4 | Ph4003-40 | Ph4127-5 | BR3731-52 | Irg 184-1.5 Irg 819-1.5 | Acryl Sil-(1.0) | Irganox 1035-(1.0) | Sylvatac RE40-(20) |
| Test coating 5 | Ph4003-43 | Ph4127-2 | BR3731-52 | Irg 184-1.5 Irg 819-1.5 | Acryl Sil-(1.0) | Irganox 1035-(1.0) | Sylvatac RE-40N-(15) |
| Test coating 10 | Ph4003-25 | Tone-20 | BR3741-52 | Irg 184-1.5 Irg 819-1.5 | Acryl Sil-(1.0) | Irganox 1035-(1.0) | N/A |
| Test coating 11 | Ph4003-30 | Tone-15 | BR3741-52 | Irg 184-1.5 Irg 819-1.5 | Acryl Sil-(1.0) | Irganox 1035-(1.0) | Sylvalite RE 10L (0.5) |
| Test coating 12 | Ph4003-45.22 | Tone-13.04 | BR3731-39.13 | Irg 184-1.5 Irg 819-1.5 | 3-Mer-(1.0) | Irganox 1035-(1.0) | Sylvalite RE 10L (0.5) |

TABLE II

Rubber-based formulations

| Test Coatings | Polymer | Acrylated Monomer(s) | Cross-Linker (pph) | Photoinitiator (pph) | Additive (pph) | Tackifying Resin (pph) |
|---|---|---|---|---|---|---|
| Test coating 6 | D1101 (15%) | Lauryl acrylate (30%) Ph4003 (55%) | SR492 (2) | Irg 184 (1.5) Irg 819 (1.5) | Irganox 1035 (1) TRIS (1) | Nevtac 10 (5) |
| Test coating 7 | D1107 (15%) | Lauryl acrylate (30%) Ph4003 (55%) | SR492 (3) | Irg 184 (1.5) Irg 819 (1.5) | Irganox 1035 (1) TRIS (1) | Nevtac 10 (5) |
| Test coating 8 | D1101 (15%) | Lauryl acrylate (30%) Ph4003 (55%) | SR492 (1) | Irg 184 (1.5) Irg 819 (1.5) | Irganox 1035 (1) TRIS (1) | Piccovar AP 10 (5) |
| Test coating 9 | D1107 (21%) Isolene400 (25%) | Lauryl acrylate (29%) Ph4003 (25%) | SR492 (1) | Irg 184 (1.5) Irg 819 (1.5) | Irganox 1035 (1) TRIS(1) | none |

Test Coating Raw Materials
Monomers:
    Ph4003 Photomer 4003 (Nonyl phenol ethoxylated monoacrylate) from Cognis Corporation, Coating & Ink Division, Ambler, Pa.
    Ph4127 Photomer 4127 (Neopentyl glycol propoxylated diacrylate) from Cognis Corporation, Coating & Ink Division, Ambler, Pa.

SR492 Sartomer 492 (Propoxylated$_3$-trimethylolpropane triacrylate), Sartomer Co, Exton, Pa.

Tone Tone M-100 (caprolactone acrylate) from Union Carbide Company (Danbury, Conn.)

Oligomers/Polymers:

BR3731 BR3731 (Urethane Oligomer) from Bomar Specialty Company, Winsted, Pa.

BR 3741 BR 3741(Polyether based Urethane Oligomer) from Bomar Specialty Company, Winsted, Pa.

D1101 Kraton D1101 (Styrene-Butadiene linear block copolymer—SBS), Kraton Polymers, Houston, Tex.

D1107 Kraton D1107 (Styrene-Isoprene linear block copolymer—SIS), Kraton Polymers, Houston, Tex.

Isolene400 Hardman Isolene© 400 (liquid polyisoprene), Elementis Performance Polymers, Belleville, N.J.

Photoinitiator:

Irg 184 Irgacure 184 (1-hydroxycyclohexyl phenyl ketone) from Ciba Specialty Chemicals Corporation, Tarrytown, N.Y.

Irg 819 Irgacure 819 (Bis(2,4,6-trimethylbenzoyl)-phenylphosphineoxide) from Ciba Specialty Chemicals Corporation, Tarrytown, N.Y.

Antioxidant:

Irganox 1035 Thiodiethylene bis(3,5-ditertbutyl-4-hydroxy hydrocinnamate from Ciba Specialty Chemicals Corporation, Tarrytown, N.Y.

Adhesion Promoter:

Acryl Sil 3-Acryloxypropyltrimethoxysilane from Gelest Inc., Tullytown, Pa.

3-Mer 3-Mercaptopropyltrimethoxysilane from Gelest Inc., Tullytown, Pa.

Tackifiers:

Sylvatac RE-40N Sylvatac RE-40N (Rosin Ester) from Arizona Chemical Company, Jacksonville, Fla.

Sylvatac RE-40 Sylvatac RE-40 (Rosin Ester) from Arizona Chemical Company, Jacksonville, Fla.

Sylvalite RE 10L Sylvalite RE 10L(Rosin) from Arizona Chemical Company, Jacksonville, Fla.

Nevtac 10 aliphatic hydrocarbon resin from Neville Chemical Company, Neville Island, Pa.

Piccovar AP 10 aromatic hydrocarbon resin from Eastman Chemical Company, Kingsport, Tenn. (formerly from Hercules Inc., Wilmington, Del.)

Additives:

TRIS trimethylolpropane-tris-3-mercapto propionate, Aldrich Chemical Company, Milwaukee, Wis.

The Control was the primary coating of urethane acrylate dual coating system from DSM Desotech of Elgin, Ill. The physical properties of primary coatings and the control were tested in accordance with ASTM 882-97. The results of the testing are shown below in table III.

TABLE III

| Formulation | YOUNG'S MODULUS (MPa) | % Elongation |
| --- | --- | --- |
| Control | 1.0–1.3 | 80–130 |
| Test coating 6 | 0.33 | 178.6 |
| Test coating 7 | 0.28 | 83.48 |
| Test coating 8 | 0.27 | 172.13 |
| Test coating 9 | 0.29 | 247.33 |
| Test coating 1 | 0.52 | 226.8 |
| Test coating 2 | 0.55 | 218.36 |
| Test coating 3 | 0.6 | 169.03 |
| Test coating 4 | 0.8 | 134.09 |
| Test coating 5 | 0.52 | 201.45 |

Figure 4:
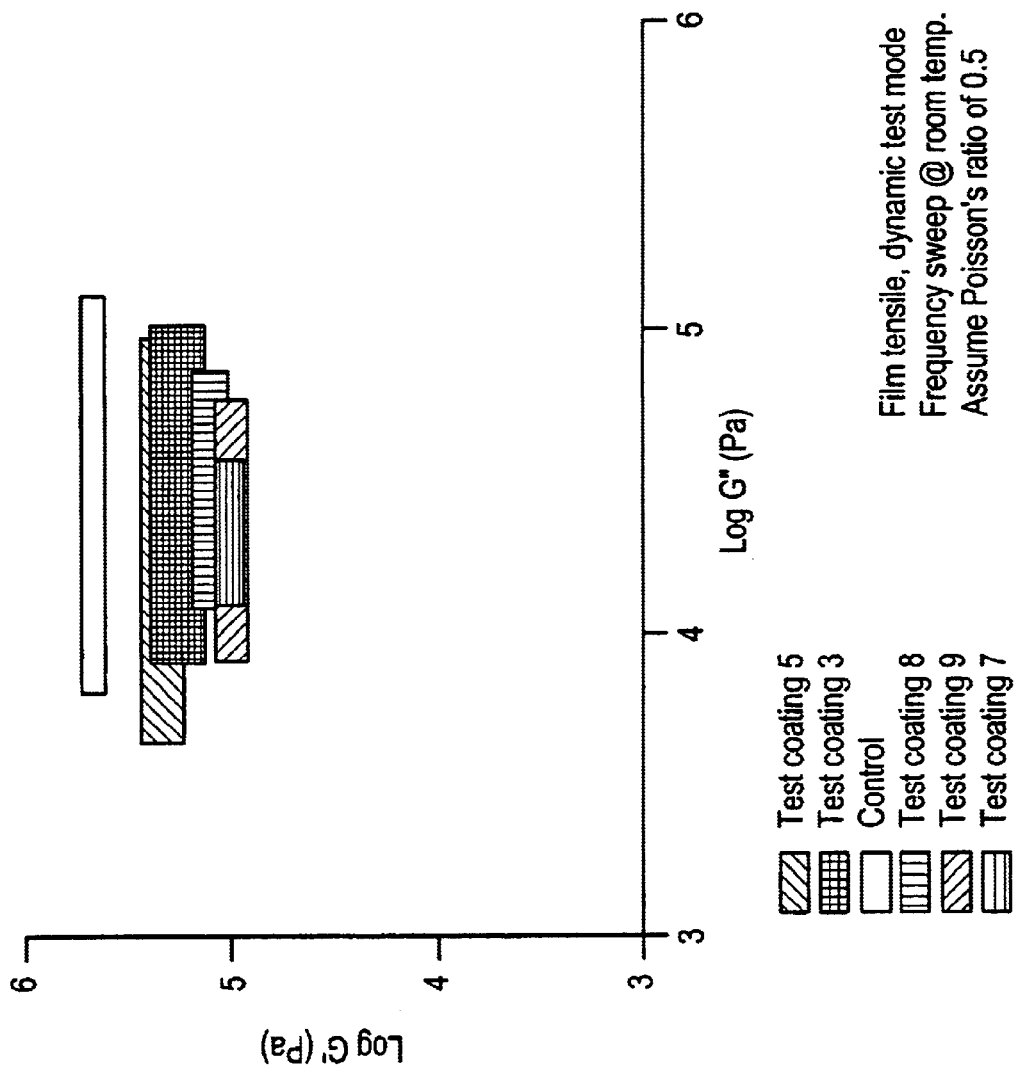
FIG. 4 is a plot of the Chang viscoelastic window for various test coatings and a control.
Figure 5:
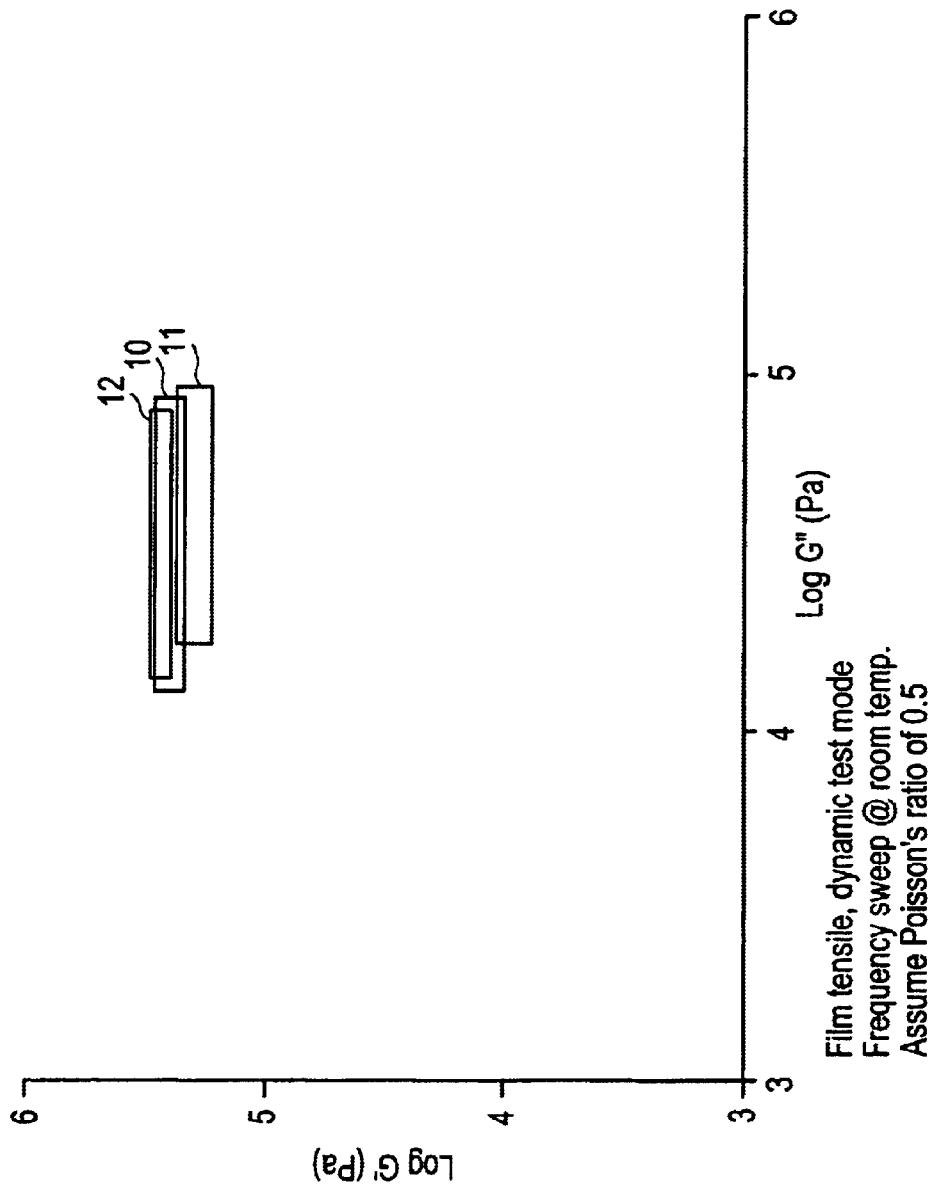
FIG. 5 is a plot of the Chang viscoelastic window for various test coatings

A Chang viscoelastic window for the test coatings 3, 5, and 7-12 and the control was prepared, as shown in FIGS. 4 and 5. The frequency for determining the coordinates for G' and G" was 0.01 R/S and 100 R/S. The testing was conducted at room temperature and the Poisson's ratio was estimated as about 0.5.

The test coatings demonstrated classic PSA characteristics. The test coatings include desirable traits such as good adhesion to glass and appropriate mechanical properties. The test coatings also have advantages of lower prices due to the low-cost raw material and the flexibility in formulating.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical fiber coating comprising:

a radiation curable composition which comprises a reactive monomer and a photoinitiator selected from the group consisting of ketones and phosphine oxides;

said composition selected such that the Young's modulus of said coating is less than about 0.9 MPa, and a Chang viscoelastic window of said composition when cured exhibits at least one set of coordinates, the coordinates are in terms of the log of viscous shear modulus (G") and the elastic shear modulus (G') in the units of Pascals, which lies within at least one of the following windows defined by the following sets of window coordinates: (1) (about 3.000, about 4.480), (about 3.000, about 3.000), (6.000, about 4.480), and (about 6.000, about 3.000); (2) (greater than about 3.840, about 5.180), (greater than about 3.840, about 4.480), (about 6.000, about 5.180), and (about 6.000, about 4.480); (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); and (5) (about 4.530, about 6.000), (about 4.530, about 5.729), (about 5.112, about 6.000), and (about 5.112, 5.729).

2. The coating according to claim 1 wherein at least a second set of coordinates lies within one of said sets of window coordinates.

3. The coating according to claim 1 wherein said at least one set coordinates of said composition lies within one of the following second sets of window coordinates: (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); (5) (about 4.530, about 6.000), (about 4.530, about 5.729), (about 5.112, about 6.000), and (about 5.112, about 5.729); (6) (about 5.440, about 5.180), (about 5.440, about 4.480), (about 6.000, about 5.180), and (about 6.000, about 4.480); (7) greater than about 3.840, about 5.180), (greater than about 3.840, about 3.850), (about 5.440, about 5.180), and (about 5.440, about 3.850); (8) (about 5.440, about 4.480), (about 5.440, about 3.000), (about 6.000, about 4.480), (about 6.000, about 3.000); (9) (about 4.530, about 3.850), (about 4.530, about 3.000), (about 5.440, about 3.850), and (about 5.440, about 3.000); (10) (about 4.106, about 5.474), (about 4.106, about 5.350), (about 4.930, about 5.474), and (about 4.930, about 5.350); (II) (about 4.232, about 5.375), (about 4.232, about 5.235), (about 4.958, about 5.375), and (about 4.958, about 5.235); and (12) (about 4.139, about 5.488), (about 4.139, about 5.409), (about 4.894, about 5.488), and (about 4.894, about 5.409).

4. The coating according to claim 2 wherein said second set of coordinates lies within at least one of the following third sets of window coordinates comprising (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.1 12, about 5.604), and (about 5.112, about 5.180); (5) (about 4.530, about 6.000), (about 4.530, about 5.729), (about 5.112, about 6.000), and (about 5.112, about 5.729); (6) (about 5.440, about 5.180), (about 5.440, about 4.480), (about 6.000, about 5.180), and (about 6.000, about 4.480); and (7) (greater than about 3.840, about 5.180), (greater than about 3.840, about 3.850), (about 5.440, about 5.180), and (about 5.440, about 3.850).

5. The coating according to claim 4 wherein said third sets of window coordinates comprises (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); (5) (about 4.530, about 6.000), (about 4.530, about 5.729), (about 5.112, about 6.000), and (about 5.112, about 5.729); and (6) (about 5.440, about 5.180), (about 5.440, about 4.480), (about 6.000, about 5.180), and (about 6.000, about 4.480).

6. The coating according to claim 1 wherein the composition further comprises a thermoplastic elastomer.

7. The coating according to claim 1 wherein the composition comprises substantially devoid of a tackifier.

8. The coating according to claim 1 wherein said composition comprises a tackifier.

9. The coating according to claim 1 wherein the composition comprises at least one compound selected from a rosin ester, an aliphatic hydrocarbon resin, an aromatic hydrocarbon resin, and combinations thereof.

10. The coating according to claim 1 wherein the composition comprises at least one compound selected from a styrene-diene block copolymer, homopolymers, and combinations thereof.

11. The coating according to claim 1 wherein the composition further comprises a sofiblock, said sofiblock comprises at least one selected from butadiene, isoprene, polyisoprene, and combinations thereof.

12. The coating according to claim 1 wherein the Young's modulus comprises less than about 0.65 MPa and a percent elongation comprises more than about 140%.

13. The coating according to claim 12 wherein the Young's modulus comprises about 0.5 MPa or less.

14. The coating according to claim 12 wherein the percent elongation comprises at least 150%.

15. The coating according to claim 1 wherein a percent elongation of the cured composition comprises more than about 131%.

16. An optical fiber coating comprising:
a radiation curable composition which comprises a reactive monomer and
a photoinitiator selected from the group consisting of ketones and phosohine oxides; said composition selected such that the Young's modulus of the coating is less than about 0.9 MPa and
at least one of the set of coordinates of a Chang viscoelastic window of said composition when cured does not lie within anyone of the windows defined by the following sets of window coordinates, the coordinates are in terms of the log of viscous shear modulus (G") and the elastic shear modulus (G') in the Units of Pascals,: (A) (about 3.000, about 5.180), (about 3.000, about 4.480), (less than about 3.850, about 5.180), and (less than about 3.85, about 4.480); (B) (about 3.000, about 6.000), (about 3.000, about 5.180), (about 4.530, about 6.000), and (about 4.530, about 5.180); and (C) (about 4.530, about 5.729), (about 4.530, about 5.604), (about 5.112, about 5.729), and (about 5.112, about 5.604).

17. The composition according to claim 16 wherein the composition further comprises a thermoplastic elastomer.

18. The composition according to claim 16 wherein the composition comprises substantially devoid of a tackifier.

19. The composition according to claim 16 wherein said composition comprises a tackifier.

20. The composition according to claim 19 wherein said tackifier comprises at least one compound selected from a rosin ester, an aliphatic hydrocarbon resin, an aromatic hydrocarbon resin, and combinations thereof.

21. The composition according to claim 17 wherein said elastomer comprises at least one compound selected from a styrene-diene block copolymer, homopolymer, and combinations thereof.

22. The composition according to claim 21 wherein the said elastomer comprises a diene which comprises at least one selected from butadiene, isoprene, and combinations thereof.

23. The composition according to claim 16 wherein the Young's modulus comprises less than about 0.65 MPa and a percent elongation comprises more than about 140%.

24. The composition according to claim 23 wherein the Young's modulus comprises about 0.5 MPa or less.

25. The composition according to claim 23 wherein the percent elongation comprises at least 150%.

26. The composition according to claim 16 wherein a percent elongation of the composition comprises more than about 131%.

27. A coated optical fiber comprising:
a core;
a cladding ehcompassing said core; and
a coating encompassing said cladding wherein said coating comprises a radiation curable composition which comprises a reactive monomer and a photoinitiator selected from the group, consisting of ketones and phosnhine oxides; said composition selected such that the Young's modulus of the coating is about 0.9 MPa or less, and
a Chang viscoelastic window, on a log scale, of said composition when cured exhibits at least one set of coordinates within at least one of the following windows defined by the following at least following sets of window coordinates, the coordinates are in terms of the log of viscous shear modulus (G") and the elastic shear modulus (G') in the units of Pascals,: (1) (about 3.000, about 4.480), (about 3.000, about 3.000), (6.000, about 4.480), and (about 6.000, about 3.000); (2) (greater than about 3.840, about 5.180), (greater than about 3.84, about 4.480), (about 6.000, about 5.180), and (about 6.000, about 4.480); (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); and (5) (about 4.530, about 6.000), (about 4.530, about 5.729), (about 5.1 12, about 6.000), and (about 5.112, about 5.729).

28. The fiber according to claim 27 wherein at a second set of coordinates lies within one of said window sets of coordinates.

29. The fiber according to claim 27 wherein said at least one set of coordinates of said composition lies within at least one of the following second sets of window coordinates: (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); (5) (about 4.530, about 6.000), (about 4.530, about 5.729), (about 5.112, about 6.000), and (about 5.1 12, 5.729); (6) (about 5.440, about 5.180), (about 5.440, about 4.480), (about 6.000, about 5.180), and (about 6.000, about 4.480); (7) (greater than about 3.840, about 5.180), (greater than about 3.840, about 3.850), (about 5.440, about 5.180), and (about 5.440, about 3.850); (8) (about 5.440, about 4.480), (about 5.440, about 3.000), (about 6.000, about 4.480), and (about 6.000, about 3.000); (9) (about 4.530, about 3.850), (about 4.530, about 3.000), (about 5.440, about 3.850), and (about 5.440, about 3.000); (10) (about 4.106, about 5.474), (about 4.106, about 5.350), (about 4.930, about 5.474), and (about 4.930, about 5.350); (11) (about 4.232, about 5.375), (about 4.232, about 5.235), (about 4.958, about 5.375), and (about 4.958, about 5.235); and (12) (about 4.139, about 5.488), (about 4.139, about 5.409), (about 4.894, about 5.488), and (about 4.894, about 5.409).

30. The fiber according to claim 29 wherein said second sets of window coordinates comprises (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); (5) (about 4.530, about 6.000), (about 4.530, about 5.729), (about 5.112, about 6.000), and (about 5.112, about 5.729); (6) (about 5.440, about 5.180), (about 5.440, about 4.480), (about 6.000, about 5.180), and (about 6.000, about 4.480); and (7) (greater than about 3.840, about 5.180), (greater than about 3.840, about 3.850), (about 5.440, about 5.180), and (about 5.440, about 3.850).

31. The fiber according to claim 29 wherein said second sets of window coordinates comprises (3) (about 5.112, about 6.000), (about 5.112, about 5.180), (about 6.000, about 6.000), and (about 6.000, about 5.180); (4) (about 4.530, about 5.604), (about 4.530, about 5.180), (about 5.112, about 5.604), and (about 5.112, about 5.180); (5) (about 4.530, about 6.000), (about 4.530, about 5.729), (about 5.112, about 6.000), and (about 5.112, about 5.729); and (6) (about 5.440, about 5.180), (about 5.440, about 4.480), (about 6.000, about 5.180), and (about 6.000, about 4.480).

32. The fiber according to claim 27 further comprising an effective area of more than about 70 $\mu m^2$ at about 1550 nm.

33. The fiber according to claim 32 wherein said effective area comprises about 80 $\mu m^2$ or more at about 1550 nm.

34. The coating according to claim 1 wherein said sets of window coordinates comprises (greater than about 3.840, about 5.180), (greater than about 3.840, about 3.850), (about 5.440, about 5.180), and (about 5.440, about 3.850).

35. The coating according to claim 16 wherein the composition has at least one set of coordinates which lies within a set of window coordinates comprising (greater than about 3.840, about 5.180), (greater than about 3.840, about 3.850), (about 5.440, about 5.180), and (about 5.440, about 3.850).

36. The coating according to claim 6 wherein said elastomer comprises a thermoplastic polyurethane.

37. The coating according to claim 1 wherein said composition further comprises a carrier.

38. The coating according to claim 16 wherein said composition further comprises a carrier.

39. The coating according to claim 16 wherein said composition further comprises a homopolymer.

40. The coating according to claim 1 wherein said composition comprises a homopolymer.

41. The coating according to claim 17 wherein said elastomer comprises a thermoplastic polyurethane.

42. The coating according to claim 16 wherein at least a second set of coordinates of coordinates exhibited by the composition does not lie within said window sets of coordinates.

43. The coating according to claim 16 wherein at least two additional sets of coordinates exhibited by the composition do not lie within said window sets of coordinates.

* * * * *